United States Patent
Agafonov et al.

(10) Patent No.: US 12,237,692 B2
(45) Date of Patent: Feb. 25, 2025

(54) WIRELESS POWER TRANSFER AND COMMUNICATION

(71) Applicant: KONINKLIJKE PHILIPS N.V., Eindhoven (NL)

(72) Inventors: Aleksei Agafonov, Eindhoven (NL); Pascal Leonard Maria Theodoor Lebens, Eindhoven (NL); Wilhelmus Gerardus Maria Ettes, Leeuwarden (NL); Johannes Hubertus Gerardus Op Het Veld, Roermond (NL)

(73) Assignee: Koninklijke Phiips N.V., Eindhoven (NL)

( * ) Notice: Subject to any disclaimer, the term of this patent is extended or adjusted under 35 U.S.C. 154(b) by 212 days.

(21) Appl. No.: 17/778,433

(22) PCT Filed: Dec. 4, 2020

(86) PCT No.: PCT/EP2020/084693
§ 371 (c)(1),
(2) Date: May 20, 2022

(87) PCT Pub. No.: WO2021/115965
PCT Pub. Date: Jun. 17, 2021

(65) Prior Publication Data
US 2023/0013685 A1    Jan. 19, 2023

(30) Foreign Application Priority Data

Dec. 10, 2019   (EP) ..................................... 19214785

(51) Int. Cl.
*H02J 50/12* (2016.01)
*H02J 50/70* (2016.01)
(Continued)

(52) U.S. Cl.
CPC .............. *H02J 50/12* (2016.02); *H02J 50/70* (2016.02); *H02J 50/80* (2016.02); *H04B 5/79* (2024.01)

(58) Field of Classification Search
CPC . H02J 50/12; H02J 50/70; H02J 50/80; H04B 5/79; H01F 38/14
See application file for complete search history.

(56) References Cited

U.S. PATENT DOCUMENTS 9,154,003 B2    10/2015 Ichikawa
2012/0242161 A1*   9/2012 Kudo .................. H04B 5/79
                                                       307/104
(Continued)

FOREIGN PATENT DOCUMENTS

CN       102684319 A     9/2012
WO    2017169708 A1    10/2017

OTHER PUBLICATIONS

International Search Report and Written Opinion from PCT/EP2020/084693 mailed Feb. 24, 2021.
QI Specification (downloaded May 9, 2022).

*Primary Examiner* — Jared Fureman
*Assistant Examiner* — Michael J Warmflash

(57) ABSTRACT

There is provided a wireless power transfer system comprising a power transmitter for providing power to a power receiver via an inductive power signal which comprises a power transmitter which in turn comprises a transmitter resonant circuit comprising a power transmitting inductor having a transmission resonance at a first frequency and arranged for generating the power transfer signal, the power transmitting inductor being arranged to be magnetically couplable to a power receiver inductor in the power receiver, a power transmitter driver, operably coupled to the power transmitter resonant circuit and arranged to generate a drive signal for the power transmitting inductor, a transmitter communication resonant circuit, different from the transmitter resonant circuit and directly or capacitively coupled to the power transmitting inductor, being arranged to establish a transmitter communication resonance at a second frequency, different from the first frequency, for communications, wherein the power transmitting inductor participates in both transmission and transmitter communication resonances and wherein the transmitter and transmitter commu- (Continued)

nication resonant circuits are arranged to be able to exhibit both first and second resonances simultaneously.

20 Claims, 9 Drawing Sheets

(51) Int. Cl.
  *H02J 50/80* (2016.01)
  *H04B 5/79* (2024.01)

(56) References Cited

U.S. PATENT DOCUMENTS

| | | | |
|---|---|---|---|
| 2013/0049481 A1* | 2/2013 | Kudo | H02J 50/80 |
| | | | 307/104 |
| 2014/0349572 A1 | 11/2014 | Ben-Shalom et al. | |
| 2015/0008756 A1 | 1/2015 | Lee et al. | |
| 2016/0181818 A1 | 6/2016 | Joye et al. | |
| 2017/0126068 A1* | 5/2017 | Greig | H02J 50/12 |
| 2017/0229920 A1 | 8/2017 | Joye et al. | |
| 2018/0131412 A1 | 5/2018 | Wilson et al. | |
| 2018/0198319 A1* | 7/2018 | Wang | A47J 27/004 |
| 2018/0316227 A1 | 11/2018 | Tasi et al. | |
| 2019/0097459 A1* | 3/2019 | Ettes | H04B 5/72 |

* cited by examiner

WIRELESS POWER TRANSFER AND COMMUNICATION

CROSS-REFERENCE TO PRIOR APPLICATIONS

This application is the U.S. National Phase application under 35 U.S.C. § 371 of International Application No. PCT/EP2020/084693, filed on Dec. 4, 2020, which claims the benefit of EP Patent Application No. EP 19214785.8, filed on Dec. 10, 2019. These applications are hereby incorporated by reference herein.

FIELD OF THE INVENTION

The present invention relates to communications in wireless power transfer, in particular, but not exclusively to communications between the power transmitter and power receiver requiring significant amounts of data to be transferred.

BACKGROUND

Most present-day electrical products require a dedicated electrical contact in order to be powered from an external power supply. However, this tends to be impractical and requires the user to physically insert connectors or otherwise establish a physical electrical contact. Typically, power requirements also differ significantly, and currently most devices are provided with their own dedicated power supply resulting in a typical user having a large number of different power supplies with each power supply being dedicated to a specific device. Although, the use of internal batteries may avoid the need for a wired connection to a power supply during use, this only provides a partial solution as the batteries will need recharging (or replacing). The use of batteries may also add substantially to the weight and potentially cost and size of the devices.

In order to provide a significantly improved user experience, it has been proposed to use a wireless power supply wherein power is inductively transferred from a transmitting inductor in a power transmitter device to a receiver coil in the individual devices.

Power transmission via magnetic induction is a well-known concept, mostly applied in transformers having a tight coupling between a primary transmitting inductor/coil and a secondary receiver coil. By separating the primary transmitter coil and the secondary receiver coil between two devices, wireless power transfer between these becomes possible based on the principle of a loosely coupled transformer.

Such an arrangement allows a wireless power transfer to the device without requiring any wires or physical electrical connections to be made. Indeed, it may simply allow a device to be placed adjacent to, or on top of, the transmitter coil in order to be recharged or powered externally. For example, power transmitter devices may be arranged with a horizontal surface on which a device can simply be placed in order to be powered.

Furthermore, such wireless power transfer arrangements may advantageously be designed such that the power transmitter device can be used with a range of power receiver devices. In particular, a wireless power transfer approach, known as the Qi Specifications, has been defined and is currently being developed further. This approach allows power transmitter devices that meet the Qi Specifications to be used with power receiver devices that also meet the Qi Specifications without these having to be from the same manufacturer or having to be dedicated to each other. The Qi standard further includes some functionality for allowing the operation to be adapted to the specific power receiver device (e.g. dependent on the specific power drain).

The Qi Specification is developed by the Wireless Power Consortium and more information can e.g. be found on their website: http://www.wirelesspowerconsortium.com/index-.html, where in particular the defined Specification documents can be found.

Before power transfer can commence, the power transmitter and power receiver need to perform mutual identification and negotiation of the conditions for power transfer. These are defined in the Qi specifications, as are methods of communication which use modulation of the power signal. Since the frequency of the power signal carrier is in the 100 kHz region and the inertia of the system is significant, the data rates which are possible are relatively low.

In some situations, particularly with higher power systems, the amount of data that needs to be exchanged become significant because more checks are required for reasons of safety.

SUMMARY

Accordingly, the invention seeks to mitigate, alleviate or eliminate one or more of the above mentioned issues, singly or in any combination.

Thus there is provided a power transmitter for wirelessly providing power to a power receiver via an inductive power transfer signal, the power transmitter comprising a transmitter resonant circuit comprising a power transmitting inductor having a transmission resonance at a first frequency and arranged for generating the power transfer signal, the power transmitting inductor being arranged to be magnetically couplable to a power receiver inductor in the power receiver, a power transmitter driver, operably coupled to the power transmitter resonant circuit and arranged to generate a drive signal for the power transmitting inductor, and a transmitter communication resonant circuit, different from the transmitter resonant circuit and directly or capacitively coupled to the power transmitting inductor and without significant magnetic coupling to the power transmitter inductor, being arranged to establish a transmitter communication resonance at a second frequency, different from the first frequency, for communications, wherein the power transmitting inductor participates in both transmission and transmitter communication resonances and wherein the transmitter and transmitter communication resonant circuits are arranged to be able to exhibit both first and second resonances simultaneously.

This arrangement is much less sensitive to relative placement of power transmitter and receiver thus moving of the power receiver by the user poses less risk of a communications interruption. Furthermore, the design constraints are relaxed in comparison with NFC-based systems, making the overall design of the power transmitter and receiver easier. Together with possible savings in components, this may help reduce the cost of the overall system.

In an embodiment, the power signal and the communication signal pass via the power transmitting inductor.

In an embodiment, the power signal and communication signal may be present simultaneously.

Because the transmission and communication resonances are present simultaneously, it is possible to have the power transfer and communication signals present at the same time. Furthermore, the MHz frequency of the communication carrier offers the possibility of a much higher bandwidth than the techniques using modulation of the power signal, such as load modulation.

In an embodiment, in the power transmitter, the transmitter communication resonant circuit comprises a transmitter communication inductor (305), the transmitter communication inductor (305) being arranged to be not substantially magnetically coupled to a receiver communication inductor present in a power receiver.

Because the communication inductors are not magnetically coupled to any significant degree and the communication signal passes via the power transmitting and receiving inductors, the communication signal is less prone to being perturbed by the relative positioning of power receiver and transmitter. Indeed, the risk that the communication signal be interrupted by the power receiver being moved is further reduced.

In an embodiment, the second frequency is at least 7 times the first frequency. The higher carrier frequency allows a higher data rate than the load modulation which in turn allows more complicated negotiations/communication protocols and enhanced safety features.

In an embodiment, the transmitter communication inductor is a separate component from the power transmitting inductor. In a further embodiment, the transmitter communication inductor comprises an electromagnetic shield.

In embodiment, the transmitter communication inductor is formed by a portion of the same inductor forming the power transmitting inductor. This may provide a cost-effective solution in that an extra component is avoided.

In an embodiment, there is a communication driver coupled to the transmitter communication resonant circuit and arranged to generate a communication drive signal. This allows the power transmitter to respond to a power receiver using the high frequency system.

In an embodiment, the power transmitter further comprises communication receiver (501) being coupled to the transmitter communication resonant circuit and being arranged decode a communication signal, allowing it to receive high frequency communications.

Similarly, there is provided a power receiver for receiving power wirelessly via an inductive power transfer signal; the power receiver comprising a power receiving inductor for extracting power from the power transfer signal, a receiver resonant circuit operably coupled to the power receiving inductor and arranged to establish a receiving resonance at a first frequency, and a receiver communication resonant circuit, different from the receiver resonant circuit and directly or capacitively coupled to the power receiver inductor and without significant magnetic coupling to the power receiver inductor, being arranged to establish a receiver communication resonance at a second frequency, different from the first frequency, for communications, wherein the power receiver inductor participates in both receiving and receiver communication resonances and wherein the transmitter and transmitter communication resonant circuits are arranged to be able to exhibit both first and second resonances simultaneously.

In an embodiment, the communication signal passes via the power receiving inductor.

In an embodiment, the second receiver resonant circuit comprises a receiver communication inductor arranged to be not substantially magnetically coupled to a communication inductor present in a power transmitter.

In an embodiment, the receiver communication inductor is a separate component from the power transmitting inductor.

In an embodiment, the receiver communication inductor comprises an electromagnetic shield.

In an embodiment, the receiver communication inductor is formed by a portion of the same inductor forming the power receiving inductor.

In an embodiment, the power receiver further comprises a communication driver coupled to the receiver communication resonant circuit and arranged to generate a communication drive signal.

In an embodiment, the power receiver further comprises a communication receiver being coupled to the receiver communication resonant circuit and being arranged decode a communication signal.

There is also provided a wireless power transfer system comprising a power transmitter for providing power to a power receiver via an inductive power signal comprising a power transmitter comprising a transmitter resonant circuit comprising a power transmitting inductor having a transmission resonance at a first frequency and arranged for generating the power transfer signal, the power transmitting inductor being arranged to be magnetically couplable to a power receiver inductor in the power receiver, a power transmitter driver, operably coupled to the power transmitter resonant circuit and arranged to generate a drive signal for the power transmitting inductor, a transmitter communication resonant circuit, different from the transmitter resonant circuit and directly or capacitively coupled to the power transmitting inductor, being arranged to establish a transmitter communication resonance at a second frequency, different from the first frequency, for communications, wherein the power transmitting inductor participates in both transmission and transmitter communication resonances and wherein the transmitter and transmitter communication resonant circuits are arranged to be able to exhibit both first and second resonances simultaneously and the power receiver comprising a power receiving inductor for extracting power from the power transfer signal a receiver resonant circuit operably coupled to the power receiving inductor and arranged to establish a receiving resonance at a first frequency, a receiver communication resonant circuit, different from the receiver resonant circuit and directly or capacitively coupled to the power receiver inductor, being arranged to establish a second receiver resonance at a second frequency, different from the first frequency, for communications, and wherein the power receiver inductor participates in both receiving and receiver communication resonances and wherein the transmitter and transmitter communication resonant circuits are arranged to be able to exhibit both first and second resonances simultaneously, the system being arranged to perform at least a part of communication between the power transmitter and power receiver using a carrier at the second frequency passing via power transmitter and power receiver inductors.

There is also provided a method of wireless power transfer using a power transmitter as presented herein to provide power to a power receiver according to any of as presented herein via an inductive power transfer signal, which comprises in the power transmitter, generating a drive signal and applying the drive signal to the power transmitting inductor so as to generate a power transfer signal, generating a communication signal by applying a communication drive signal to the second resonant circuits in either the power receiver or the power transmitter, wherein the power signal and the communication signal are present simultaneously.

BRIEF DESCRIPTION OF THE DRAWINGS

The above, as well as additional objects, features and advantages of the disclosed devices, systems and methods, will be better understood through the following illustrative and non-limiting detailed description of embodiments of devices and methods, with reference to the appended drawings, in which.

DETAILED DESCRIPTION OF EMBODIMENTS

In the following description, same references designate like elements.

The following description focuses on embodiments of the invention applicable to a wireless power transfer system utilizing a power transfer approach such as known from the Qi specification. However, it will be appreciated that the invention is not limited to this application but may be applied to many other wireless power transfer systems.

Figure 1:
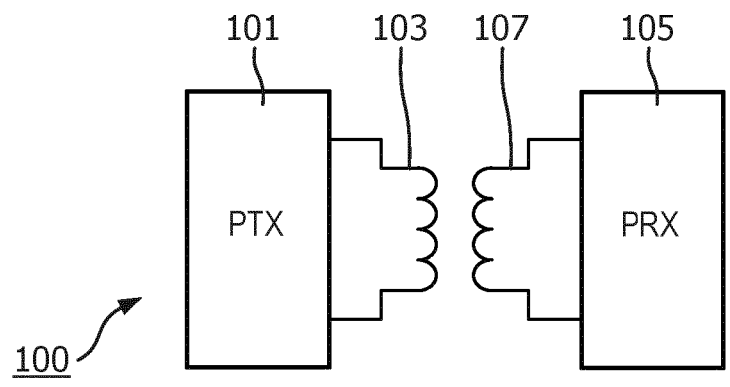
FIG. 1 represents a wireless power transfer system.

FIG. 1 illustrates an example of a power transfer system 100 in accordance with some embodiments of the invention. The power transfer system comprises a power transmitter 101 which includes (or is coupled to) a transmitter coil/inductor 103. The system further comprises a power receiver 105 which includes (or is coupled to) a receiver coil/inductor 107.

The system 100 provides an electromagnetic power signal which may inductively transfer power from the power transmitter 101 to the power receiver 105. Specifically, the power transmitter 101 generates an electromagnetic signal, which is propagated as a magnetic flux by the power transmitting coil or inductor 103. The power signal may typically have a frequency between around 20 kHz to around 500 kHz, and often for Qi compatible systems typically in the range from 95 kHz to 205 kHz (or e.g. for high power kitchen applications, the frequency may e.g. typically be in the range between 20 kHz to 80 kHz). The power transmitting inductor 103 and the power receiving inductor 107 are loosely coupled and thus the power receiving coil 107 picks up (at least part of) the power signal from the power transmitter 101. Thus, the power is transferred from the power transmitter 101 to the power receiver 105 via a wireless inductive coupling from the transmitter coil 103 to the power receiving coil 107. The term power signal is mainly used to refer to the inductive signal/magnetic field between the transmitter coil 103 and the power receiving coil 107 (the magnetic flux signal), but it will be appreciated that by equivalence it may also be considered and used as a reference to an electrical signal provided to the transmitter coil 103 or picked up by the power receiving coil 107.

In the example, the power receiver 105 is specifically a power receiver that receives power via the receiver coil 107. However, in other embodiments, the power receiver 105 may comprise a metallic element, such as a metallic heating element, in which case the power signal directly induces eddy currents resulting in a direct heating of the element.

The system 100 may be arranged to transfer substantial power levels, and specifically the power transmitter 101 may support power levels in excess of 500 mW, 1 W, 5 W, 50 W, 100 W or 500 W in many embodiments. For example, for Qi corresponding applications, the power transfers may typically be in the 1-5 W power range for low power applications (the basic power profile), up to 15 W for Qi specification version 1.2, in the range up to 100 W for higher power applications such as power tools, laptops, drones, robots etc., and in excess of 100 W and up to more than 1000 W for very high power applications, such as e.g. kitchen applications.

In the following, the operation of the power transmitter 101 and the power receiver 105 will be described with specific reference to an embodiment generally in accordance with the Qi Specification (except for the herein described (or consequential) modifications and enhancements) or suitable for the higher power kitchen specification being developed by the Wireless Power Consortium. In particular, the power transmitter 101 and the power receiver 105 may follow, or substantially be compatible with, elements of the Qi Specification version 1.0, 1.1 or 1.2 (except for the herein described (or consequential) modifications and enhancements).

Figure 2A:
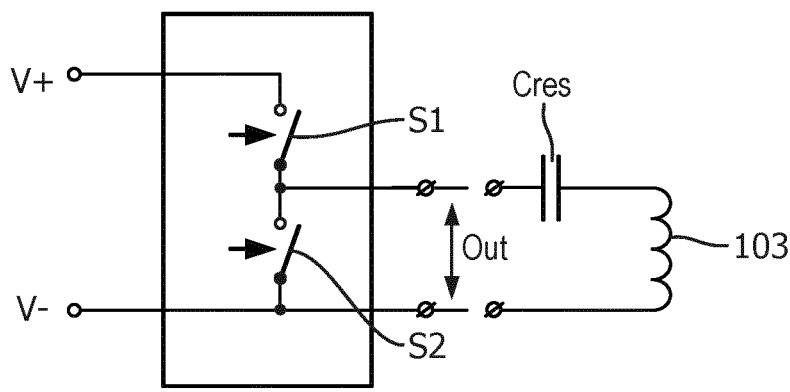
FIGS. 2a and 2b represent examples of a half bridge and full bridge inverters for a power transmitter.

FIG. 2a shows a schematic of a half-bridge switch bridge/inverter as used in embodiments of a power transmitter 101. A DC voltage is applied across the input terminals V+ and V−. The switches S1 and S2 are controlled such that they are never closed at the same time. Alternatingly S1 is closed while S2 is open and S2 is closed while S1 is open. The switches are opened and closed with the desired frequency, thereby generating an alternating signal at the output. Typically, the output of the inverter is connected to the power transmitting inductor 103 via a resonance capacitor Cres.

Figure 2B:
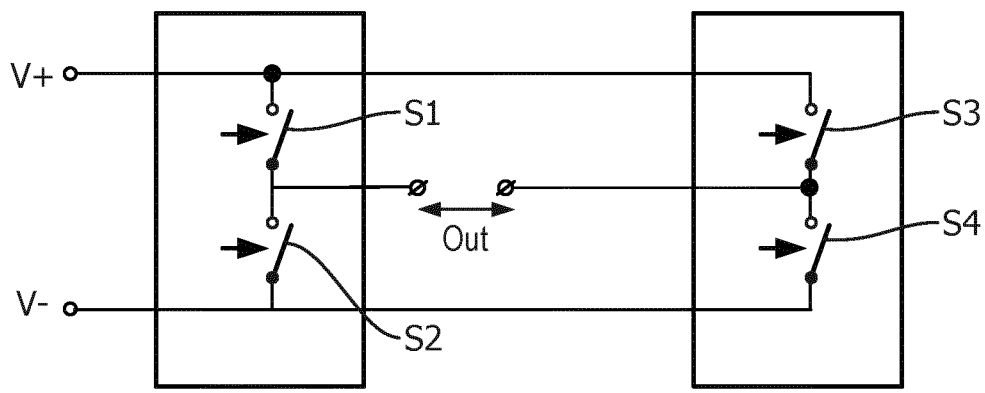

FIG. 2b shows a schematic of a full-bridge switch bridge/inverter as used in embodiments of a power transmitter 101. A DC voltage is applied across the input terminals V+ and V−. In some modes of operation, the switches S1 and S2 are controlled such that they are never closed at the same time. The switches S3 and S4 are controlled such that they are never closed at the same time. Alternatingly switches S1 and S4 are closed while S2 and S3 are open, and then S2 and S3 are closed while S1 and S4 or open, thereby creating a square-wave signal at the output. The switches are opened and closed with the desired frequency. In another mode of operation, S1 and S3 are open and S2 and S4 closed in a part of the time and vice versa. This is often called phase control. These arrangements produce a square-wave type of output at what becomes the power signal carrier frequency. The effect of the inductance of the power transmitter inductance 103 is to transform this into what is close to a sine wave. However, since the switches in the inverters have finite opening and closing times, there are short instances of current flow directly from V+ to V− which result in spikes on the zero-crossings of the power signal sine wave. Being spikes, in a frequency-domain, these will appear as high-frequency components to the power signal. For power transfer, these spikes can be filtered out by the receiver resonant circuit and any other necessary filtering.

For high power systems (for example transferring 100 W), the power transmitter and the power receiver typically establish the communication channel in order to perform control of the wireless power transfer and/or to perform authentication or other auxiliary data transfer between power receiver and power transmitter.

It could be possible to use a parallel channel of communication (out-of-band), such as NFC. However, this presents a number of problems.

For NFC to work, the NFC antennas need to be well aligned. In a situation such as in a cordless kitchen, it can happen that the user moves the power receiver. Whilst this repositioning may be within the tolerances of the power transfer, it could perturb the NFC field to an extent that it interrupts any NFC communications that happen to be occurring at that moment. This can have the consequence of causing errors at the level of the system control which may in turn lead to a reset of the power transfer.

The NFC antenna must be positioned so as not to be affected by the power transfer inductor 103, 107 (transmitting or receiving). This imposes extra design constraints on the power transmitter 101 or power receiver 105.

Importantly, the NFC system can only operate when the power signal is below a relatively low level.

Lastly the NFC system comes with a cost implications linked to the hardware and other considerations of which the skilled person will be aware.

Therefore, a solution which addresses the above concerns is desirable.

Figure 3:
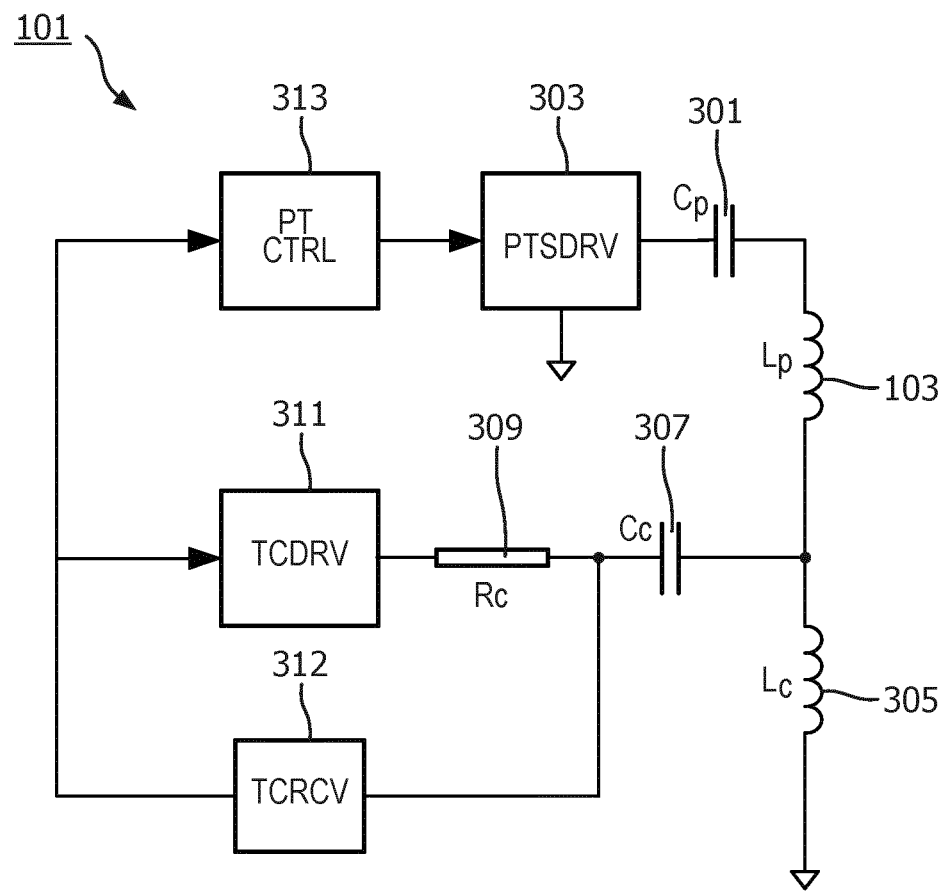
FIG. 3 represents circuitry in a wireless power transmitter according to an embodiment.

FIG. 3 illustrates exemplary elements of a power transmitter, in particular resonant circuits associated with the power transmitting inductor 103.

A capacitor 301 ($C_p$) is connected between the power transmitting inductor 103 and a power transmitter driver 303 (PTSDRV). The power transmitter driver 303 may contain elements such as those described in relation to FIGS. 2a and 2b. The capacitor 301 and power transmitting inductor 103 form a first (series) resonant circuit. Frequently, the carrier of the power signal is between 20 and 300 kHz. Thus, resonant circuit (the transmitter resonant circuit) may have a resonant frequency $\omega_p$ in this range, for example 100 kHz, somewhere around the frequency of the power signal carrier. A second inductor 305 (a transmitter communication inductor, $L_c$) is coupled between the power transmitting inductor 103 and a lower reference potential. In the present example, it is desirable that the coupling of the transmitter communication inductor 305 to the power transmitting inductor 103 be either direct (in other words DC) or capacitive.

To the coupling point of the power transmitting inductor 103 and the transmitter communication inductor 305 is coupled a capacitor 307 ($C_c$) which is in turn coupled to a resistor 309 ($R_c$). The other terminal of the resistor 309 is connected to a transmitter communication driver 311 (TCDRV). Between the capacitor 307 and the resistor 309, a transmitter communication receiver 312 is coupled, the transmitter communication receiver 312 (TCRCV) being arranged to detect, demodulate and decode a communication signal. A power transmitter controller 313 (PTCTRL) is connected to the power transmitter driver 303, the transmitter communication driver 311 and transmitter communication receiver 312 so as to control generation of the power signal and communications with the power receiver 105.

A second (series) resonant circuit (the transmitter communication resonant circuit) is formed by the transmitter communication inductor 305, the capacitor 307, the resistor 309 and the power transmitting inductor 103. A convenient choice of carrier frequency for a communication signal would be around a decade higher (if not more) than the power signal carrier. Therefore, in the present example, the resonant frequency $\omega_c$ of this, the transmitter communication resonant circuit, may be in the range of MHz's, for example around 1.1 MHz. The communication is, relatively, "high frequency".

The power transmitter driver 303 and transmitter communication driver 311 are both referenced to the lower reference or lower reference potential.

Figure 4A:
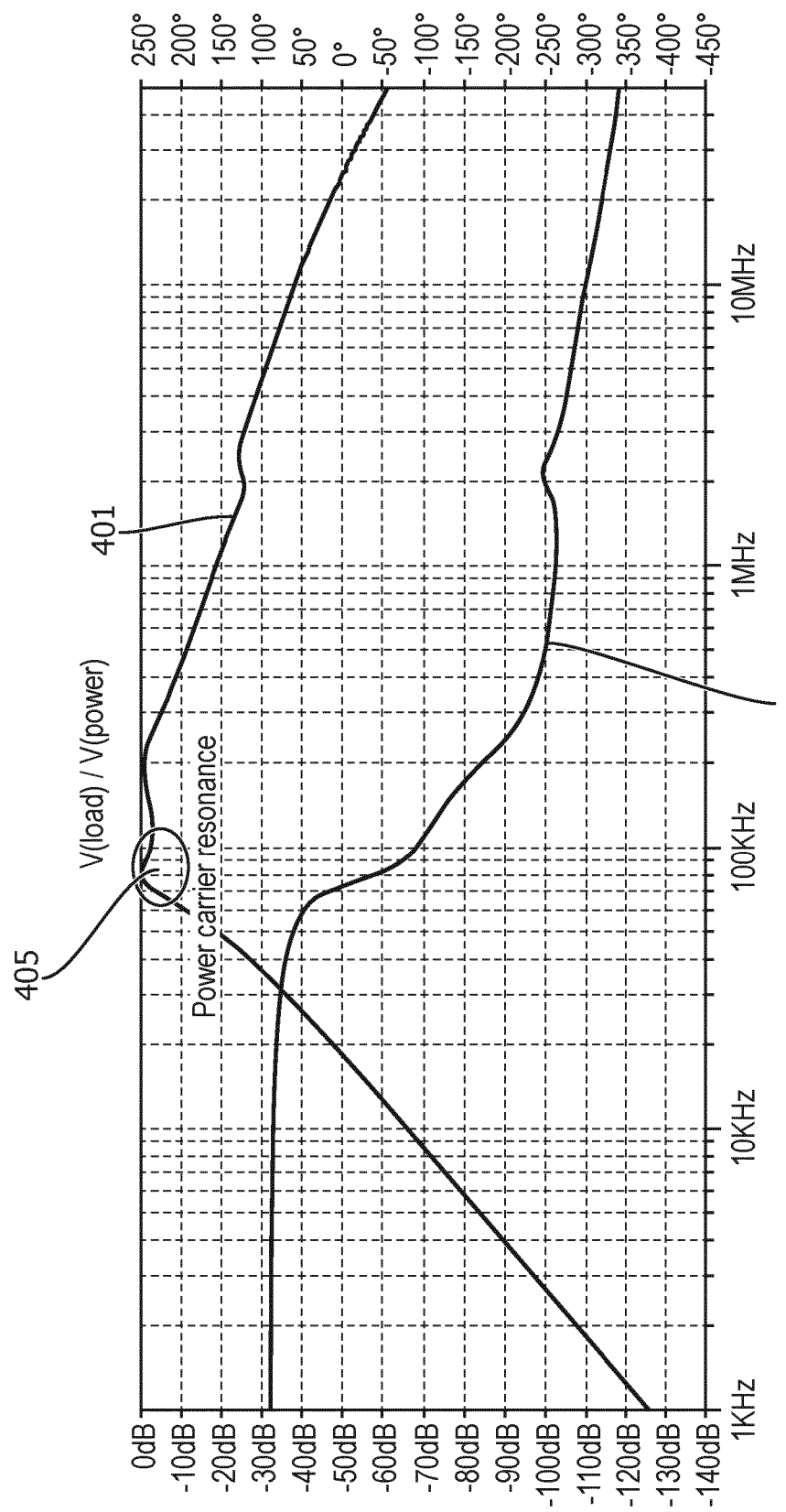
FIGS. 4a and 4b represent a transfer function curves of a power transmitting circuit and a communication circuit in power transmitter according to an embodiment.

FIG. 4a shows transfer curves of the transmitter resonant circuit. A first trace 401 shows the system response magnitude as a function of frequency and a second trace 403 shows the phase. A peak 405 in the power transfer is present around 100 kHz, at or around the resonance of the transmitter resonant circuit.

Figure 4B:
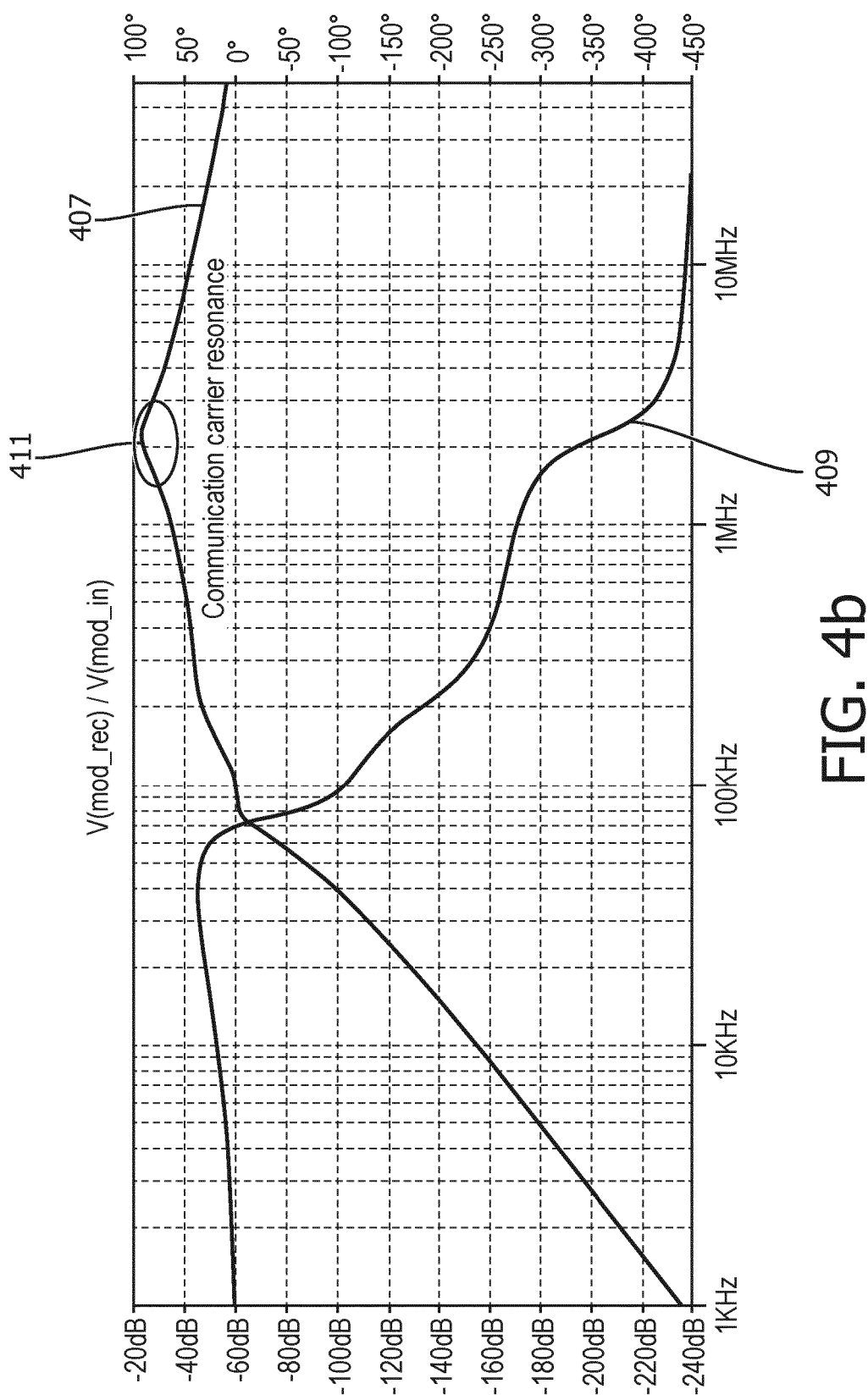

FIG. 4b shows transfer curves of the transmitter communication resonant circuit. A first trace 407 shows the system response magnitude as a function of frequency and a second trace 409 shows the phase. A peak 411 in the power transfer is present around 1.1 MHz, at the resonance of the transmitter communication resonant circuit.

Thus the power transmitter 101 for wirelessly providing power to a power receiver 103 via an inductive power transfer signal, the power transmitter 101 comprises a transmitter resonant circuit comprising a power transmitting inductor having a transmission resonance at a first frequency and arranged for generating the power transfer signal, the power transmitting inductor being arranged to be magnetically couplable (i.e. may be coupled magnetically) to a power receiver inductor in the power receiver; a power transmitter driver 303, operably coupled to the power transmitter resonant circuit and arranged to generate a drive signal for the power transmitting inductor 103, a transmitter communication resonant circuit, different from the transmitter resonant circuit and directly or capacitively coupled to the power transmitter inductor, being arranged to establish a transmitter communication resonance at a second frequency, different from the first frequency, for communications, and a communication circuit being coupled to the second transmitter resonant circuit and being arranged to generate a communication drive signal, wherein the power transmitting inductor 103 participates in both transmission and transmitter communication resonances and wherein the transmitter and transmitter communication resonant circuits (in the present example, respectively 301+103 and 305+307+309+103) are arranged to be able to exhibit both first and second resonances simultaneously.

Figure 5:
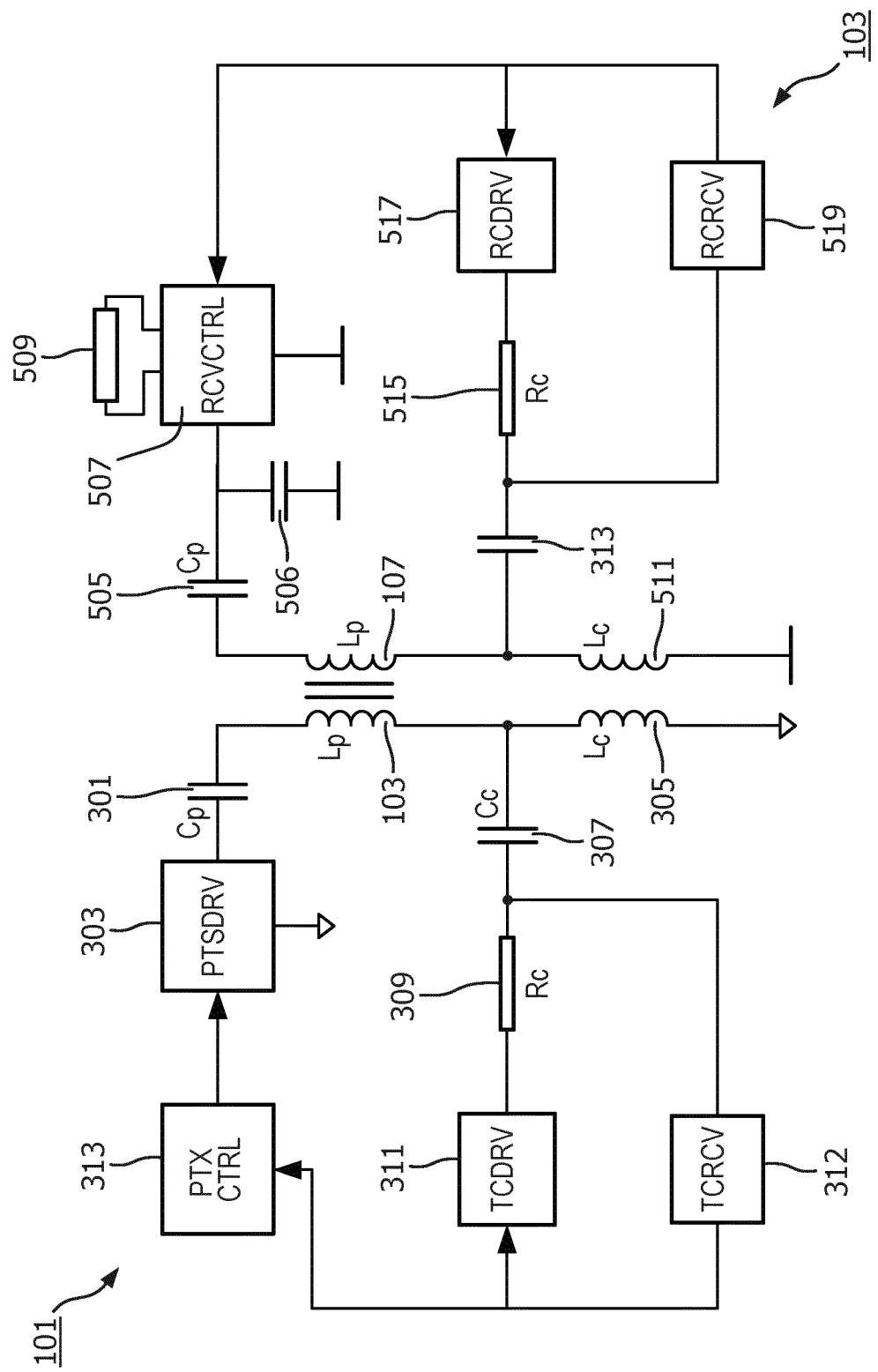
FIG. 5 represents circuitry of a power transmitter and a power receiver according to an embodiment and arranged for operation.

FIG. 5 represents a power transmitter 101 and a power receiver 103, and elements thereof, arranged to perform power transfer and communications according to an embodiment. The elements of the power transmitter 101 have been discussed with reference to FIG. 3 and will not be described.

On the power receiver 103 side, a power receiving inductor 107 is coupled via a capacitor 505 ($C_p$) to a receiver controller 507 (RCVCTRL). Capacitor 505 is also coupled, on the receiver controller side to the lower reference potential via a capacitor 506. It should be noted that the lower reference potential in the power transmitter 103 has no direct connection to the lower reference potential in the power receiver 105 and that the absolute values of each, relative to a true ground, may be quite different. The power receiving inductor 103 and the capacitor 505 for a first resonant circuit on the receiver side, the receiver resonant circuit. The receiver controller 507 extracts power from the power signal which is captured by power receiving inductor 107 using the receiver resonant circuit. In a similar manner to the power transmitter 103, the receiver resonant circuit has a resonant frequency in the range of 20-200 kHz, for example around 100 kHz. It is desirable that the resonant frequencies of transmitter and receiver resonant circuits be the same. The receiver controller 507 is coupled to a load 509 to which it provides power. The coupling of receiver controller and load 509 comprised switching and/or other elements which allow modulation of the load as seen by the power receiving inductor. This coupling will not be discussed here and is within the reach of the skilled person.

A receiver communications inductor 511 ($L_c$) is coupled between the power receiving inductor 107 and a lower reference or lower reference potential. In this example, it is desirable that this coupling be either direct (DC) or capacitive). To the coupling point of the power receiver inductor 103 and the receiver communications inductor 511, is coupled a capacitor 513 ($C_c$) which is in turn coupled to a resistor 515. The other terminal of the resistor 515 is coupled to a receiver communication driver 517 (RCDRV).

In a manner similar to that of the power transmitter 103, a second resonant circuit (the receiver communication resonant circuit) is formed by the receiver communication inductor 511, the capacitor 513, the resistor 515 and the power receiving inductor 107. The resonant frequency of this, the transmitter communication resonant circuit, may be in the range of MHz's, for example around 1.1 MHz.

A receiver communication receiver 519 (RCRCV) is coupled to the receiver communication resonant circuit and is arranged to demodulate and decode a communication signal received via the receiver communication resonant circuit.

Because the power transmitting inductor 103 participates in the transmitter communication resonant circuit, it is possible for it to transmit a communication signal with a carrier frequency around the resonance of the transmitter communication resonant circuit i.e. in MHz range. Thus power signal and the communication signal may pass via the power transmitting inductor and the power signal and communication signal may be present simultaneously.

Thus a power receiver for receiving power wirelessly via an inductive power transfer signal; the power receiver (103) may comprise a power receiving inductor (107) for extracting power from the power transfer signal, a receiver resonant circuit operably coupled to the power receiving inductor and arranged to establish a receiving resonance at a first frequency, a receiver communication resonant circuit operably, coupled to the power receiving inductor (107) and arranged to establish a second receiver resonance at a second frequency, a receiver communication resonant circuit, different from the receiver resonant circuit and directly or capacitively coupled to the power receiver inductor (107), being arranged to establish a receiver communication resonance at a second frequency, different from the first frequency, for communications, and a receiver communication driver (517) being coupled to the second receiver communication resonant circuit and being arranged to generate a communication drive signal, wherein the power receiver inductor (107) participates in both receiving and receiver communication resonances and wherein the transmitter and transmitter communication resonant circuits are arranged to be able to exhibit both first and second resonances simultaneously.

As shown in FIG. 5, the power transmitting inductor and the power receiving inductor 107 are magnetically coupled. In many instances, the inductive coupling factor k of this coupling is in the range of 0.2 to 0.8. However, for the communication inductors 305, 511, it is desirable that they have no significant magnetic coupling, either to the respective 'power' inductors 103, 107 or to each other. Such a situation would risk generating a counter-phase communication signal in one or both of communication inductors 305 or 511 which then have unpredictable effects and possibly degrade the communication signal. More importantly, it is intended that the communication signal pass via the transmitter and receiver inductors 103, 107 and their magnetic coupling. By 'no significant magnetic coupling', it is meant that magnetic coupling below 1% would be sufficiently low for acceptable performance and below 0.1% is desirable. The level of magnetic coupling could be checked by looking for the presence of a measurable counter-phase communication signal.

The advantages of this arrangement are multiple.

Because the communication inductors 305, 511 are not magnetically coupled to any significant degree and the communication signal passes via the power transmitting and receiving inductors 103, 107, the communication signal is less prone to being perturbed by the relative positioning of power receiver 103 and transmitter 101. Indeed, the risk that the communication signal be interrupted by the power receiver 103 being moved is reduced.

Because the transmission and communication resonances are present simultaneously, it is possible to have the power transfer and communication signals present at the same time. Furthermore, the MHz frequency of the communication carrier offers the possibility of a much higher bandwidth than the techniques using modulation of the power signal, such as load modulation.

Furthermore, the design constraints are relaxed in comparison with NFC-based systems, making the overall design of the power transmitter and receiver 101, 103 easier. Together with possible savings in components, this may help reduce the cost of the overall system.

Signal flows will now be discussed with reference to the power transmitter 103 though the analogous analysis may be applied to the power receiver 103. The power signal carrier flows through a path $C_p$-$L_p$-$L_c$ i.e. 301-103-305. At the carrier frequency of the power signal (the "low frequency"), capacitor 307 ($C_c$) has a high impedance and the communication inductor 305 ($L_c$) has a much lower impedance. For example, where there is about a decade difference between power signal and communication signal carrier frequencies, the impedance difference between capacitor 307 $C_c$ and communication inductor 305 ($L_c$) at the low frequency may be around 40 dB. This has the desirable effect of limiting the amplitude of the power signal seen by the resistor 309 ($R_c$)-communication driver/receiver circuit. The greater this amplitude, the more dynamic range the communication receiver 501 will need have to be able to discriminate between communication and power signals. This consideration of communication-power isolation makes having at least a decade difference in carrier frequencies desirable.

The current provided from the communication driver 311 flows through a path $R_c$-$C_c$ and is split between $L_c$ and $L_p$. Whilst most flows down to the lower reference potential via $L_c$, some flows through a path $L_p$-$C_p$-power transfer driver 303 (or receiver controller 507). This amount may be less than 20%. Nevertheless, the current of the communication carrier flowing through the power transmitting inductor 103 may be only a few percent of that flowing through the communication inductor 305. The current due to the communication carrier in the power transmitting inductor 103 may be given by:

$$I(L_p) = \frac{L_c}{L_p} . I(L_c) \qquad [1]$$

At the carrier frequency in the present example, the impedances of capacitor 307 ($C_p$) and driver 303 are low, effectively shorting the power transmitting inductor 103 ($L_p$) to lower reference. In the present example, the amplitude of the communication carrier may be 5% or less of the power signal carrier. Also the communication carrier current in the power transmitting inductor 103 is only a few percent of that in the communication inductor 305. Nevertheless, this may be detected on the receiving side. Thus it is possible to have the power signal carrier and a low level of the communication carrier in the power transfer inductor 103 (or 107 for the power receiver) independently and simultaneously.

As mentioned previously, it is desirable that any inductive coupling seen by the communication inductors 305/511 be very small or negligible. This is also to ensure that desired signal flows are obtained.

Because of the nature of the driver 303, as discussed in relation to FIG. 2, there are high(er) frequency spikes on the zero-crossings of the power signal. These may be in-band for the purposes of the communication signal. If the Q-factor of the communication resonant circuit is too high, these spikes may result in oscillations in the communication resonant circuit. This in turn would require additional damping so as to be able to decode the communication signal. Therefore, the Q-factor of the communication resonant circuit be low, preferably lower than 20.

In an embodiment, the transmitter communication inductor 305 may be a separate component from the power transmitting inductor 103, for example a surface-mount component. This has the advantage that that it is small and may be placed relatively freely.

In an embodiment, transmitter communication inductor 305 comprises an electromagnetic shield. The shielding can offer improved isolation and a lower the risk of undesired coupling to one or more of the other inductors.

In an embodiment, the power transmitting inductor 103 is formed by a coil and the transmitter communication inductor 305 is formed by a portion of the same inductor, for example by coupling the capacitor 307 to a point somewhere along the length of the coil. The point should be chosen so as to obtain the desired two inductance values. This calculation is within the reach of the skilled person. It is also desirable that the choice of length for the communication-related part and the layout of the whole be made so that communication-related part does not find itself positioned in a way that might couple magnetically to an inductor in a power receiver, for example by being aligned close to and approximately parallel to that other inductor.

In an embodiment, the receiver communication inductor 511 may be a separate component from the power transmitting inductor 103, for example a surface-mount component.

In an embodiment, receiver communication inductor 511 comprises an electromagnetic shield.

In an embodiment, the power receiving inductor 107 is formed by a coil and the transmitter communication inductor 511 is formed by a portion of the same inductor, for example by coupling the capacitor 513 to a point somewhere along the length of the coil. The point should be chosen so as to obtain the desired two inductance values. This calculation is within the reach of the skilled person. It is also desirable that the choice of length for the communication-related part and the layout of the whole be made so that communication-related part does not find itself positioned in a way that might couple magnetically to an inductor in a power transmitter, for example by being aligned close to and approximately parallel to that other inductor.

In a wireless power transfer system, it is possible to have a power transmitter (101) for providing power to a power receiver (103) via an inductive power transfer signal, both according to embodiments. The power transmitter comprises a transmitter resonant circuit comprising a power transmitting inductor (103) having a transmission resonance at a first frequency and arranged for generating the power transfer signal, the power transmitting inductor being arranged to be magnetically couplable to a power receiver inductor (107) in the power receiver (103), a power transmitter driver (303), operably coupled to the power transmitter resonant circuit and arranged to generate a drive signal for the power transmitting inductor (103), a transmitter communication resonant circuit, different from the transmitter resonant circuit and directly or capacitively coupled to the power transmitter inductor, being arranged to establish a transmitter communication resonance at a second frequency, different from the first frequency, for communications, a transmitter communication receiver (501) being coupled to the second transmitter resonant circuit and being arranged to extract information from a communication signal, wherein the power transmitting inductor (103) participates in both transmission and transmitter communication resonances and wherein the transmitter and transmitter communication resonant circuits are arranged to be able to exhibit both first and second resonances simultaneously on one side. On the other side, the power receiver (103) comprises a power receiving inductor (107) for extracting power from the power transfer signal, a receiver resonant circuit operably coupled to the power receiving inductor (107) and arranged to establish a receiving resonance at a first frequency, a receiver communication resonant circuit operably, coupled to the power receiving inductor and arranged to establish a second receiver resonance at a second frequency, a receiver communication resonant circuit, different from the receiver resonant circuit and directly or capacitively coupled to the power receiver inductor (107), being arranged to establish a second receiver resonance at a second frequency, different from the first frequency, for communications, and a receiver communication driver (517) being coupled to the second transmitter resonant circuit and being arranged to generate a communication signal, wherein the power receiver inductor (107) participates in both receiving and receiver communication resonances and wherein the transmitter and transmitter communication resonant circuits are arranged to be able to exhibit both first and second resonances simultaneously.

The system may be arranged to perform at least a part of communication between the power transmitter and power receiver using a carrier at the second frequency passing via power transmitter and power receiver inductors.

By virtue of the transmission and communication resonances being present in both power transmitter 103 and power receiver 105, it is possible to use the power transmitter according to an embodiment to provide power to a power receiver according to an embodiment via an inductive power transfer signal, the use comprising in the power transmitter, generating a drive signal and applying the drive signal to the power transmitting inductor so as to generate a power signal and, in either the power transmitter 103 or the power receiver 105, generating a communication signal by applying a communication drive signal to the second resonant circuits in either the power receiver or the power transmitter, wherein the power signal and the communication signal, the "high frequency" signal, are present simultaneously.

In Wireless Power Systems with the In-band communication channel a typical method of communication from the power receiver 105 to the power transmitter 103 is load modulation. An advantageous solution is the use relative load modulation which can be achieved by the high-frequency carrier generation on the power receiver 105 side. It allows the power receiver 105 with only a single high-frequency carrier modulator to communicate to a power the transmitter 103 with and without the high-frequency demodulator. The modulation of the power signal will 'resemble' the load modulation of power transmitter which only have the 'low' frequency, older load modulation. Thus a power receiver with the high frequency modulator may still communicate with an 'old' power transmitter.

Initial communication, for instance at the start of negotiations, may be performed using known load modulation techniques applied to the power signal ("low frequency"). Part of these communications can be used to determine, for the power transmitter 103 whether the power receiver 105 is able to support the 'high frequency' communication described herein and whether this is simplex or duplex. If this is determined to be the case, then the power transmitter and receiver 103, 105 can then move to using the 'high frequency' method.

Figure 6A:
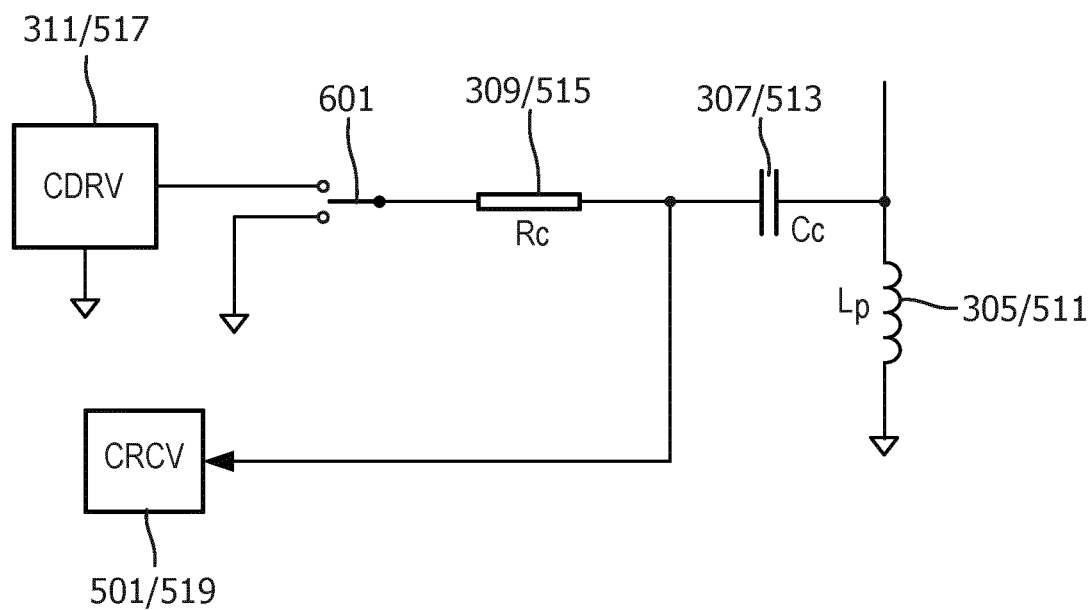
FIGS. 6a and 6b represent variants of communications circuits according to embodiments.
Figure 6B:
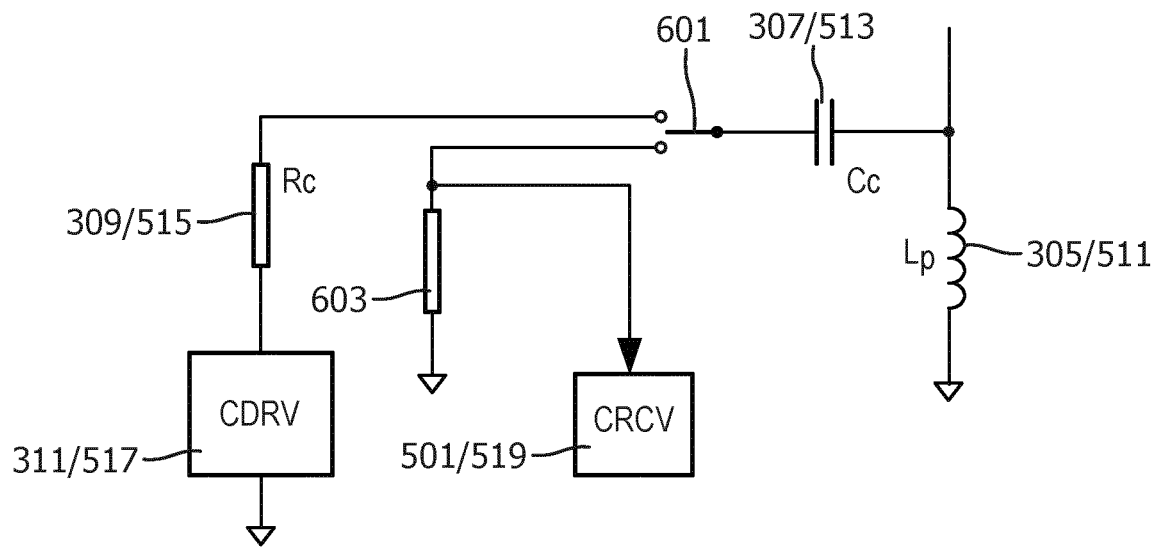

FIGS. 6a and 6b represent a communication circuit according to embodiments. In FIG. 6a, between the capacitor 307/513 and resistor 309/515, the communication receiver 501/519 is coupled. Between the resistor 309/515 and the communication driver 311/517, there is a double-throw switch 601 which may be used to disconnect the communications driver 311/517 when the communication circuit is in receiving mode. The common terminal of the switch 601 is coupled to the resistor 309/515, one switched terminal of the switch 601 is coupled to the communication driver 311/517 and the other is connected to the lower reference potential. FIG. 6b shows another embodiment where the common terminal of switch 601 is coupled to the capacitor 307/513. One switched terminal is coupled to a first resistor 309/515 and the other to a second resistor 603 which is in turn connected to the lower reference potential.

Both these arrangements provide for half-duplex communications. The desired information may be modulated onto the communication carrier signal by a variety of modulation schemes such as amplitude shift keying, phase/frequency shift keying, quadrature modulation or indeed other techniques.

In an embodiment, the communication is simplex from power receiver 105 to power transmitter 101. The power transmitter 103 has only the communication receiver 312 and the power receiver 105 does not have the communication receiver 519. In this case, the terminal of resistor 309 which is so far shown as connected to the communication driver 311 should be connected to the lower reference potential. In an embodiment having simplex communication in the other direction, it is resistor 515 which would be connected to the lower reference potential of the power receiver 105.

Figure 7:
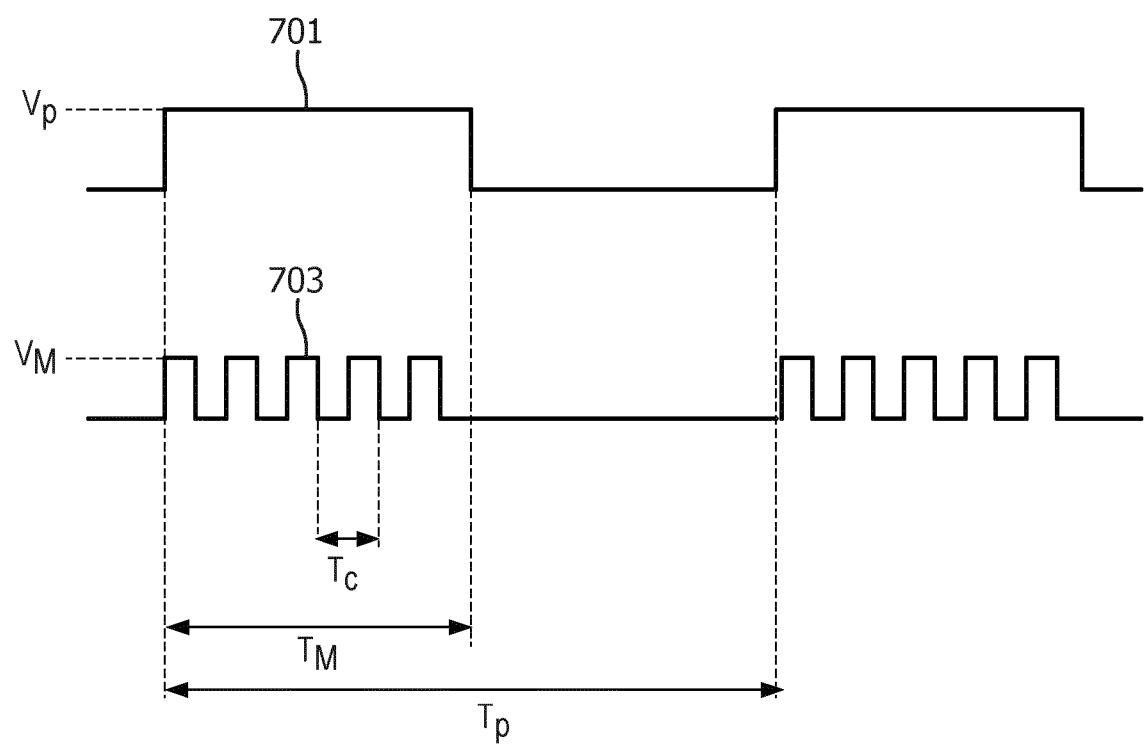
FIG. 7 represents a timing of signals in power transmitter according to an embodiment.

FIG. 7 represents advantageous relative timing of the power transfer driver signal 701 and 703. As mentioned previously, there are high(er) frequency spikes on the zero-crossings of the power signal. These may be in-band for the purposes of the communication signal. Therefore, it may be useful to restrict modulation of the communication carrier to one or other halves of the power transfer drive signal 701, rather than have modulating the communication signal during zero-crossings.

Figure 8:
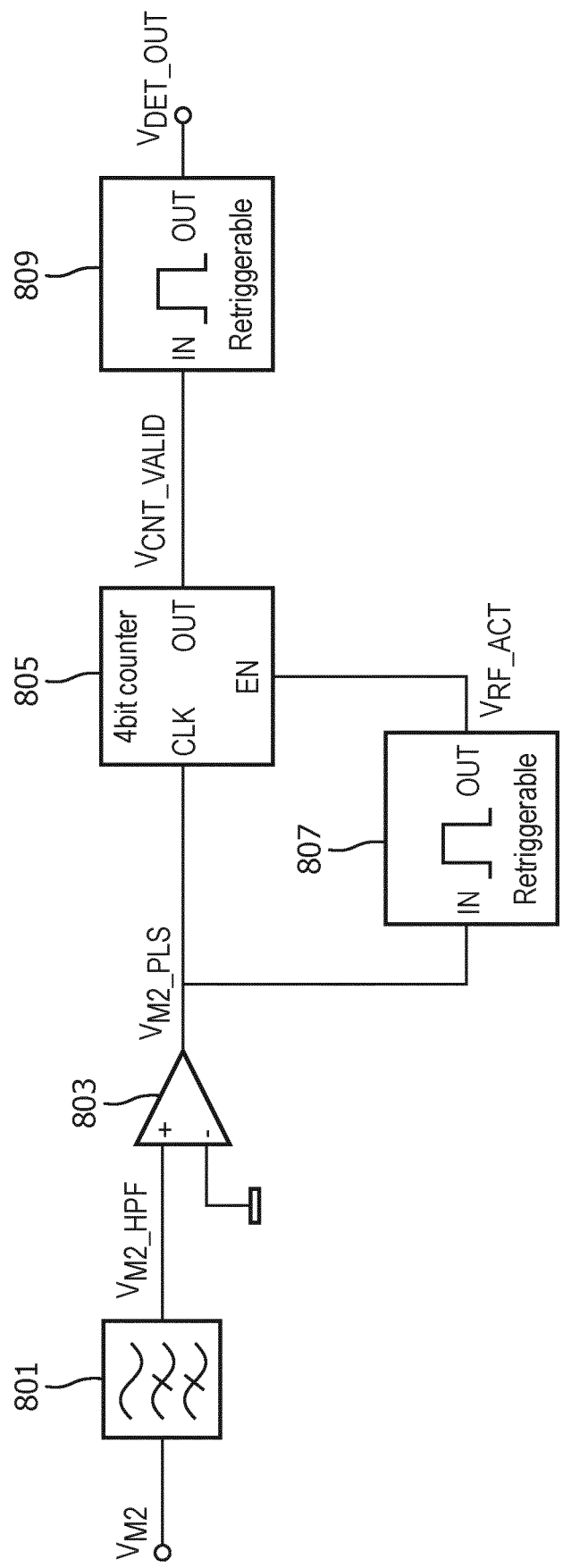
FIG. 8 represents an embodiment of a receiving part of a communication circuit according to an embodiment.

FIG. 8 represents and embodiment of a detector circuit for an on-off key modulated signal. The incoming signal (VM2) passes via a high-pass filter 801 and then an amplifier (or comparator?) 803 to arrive a recovery circuit, composed of a 4-bit counter 805 and retrigger-able multi-vibrator 807 which is arranged to reset the counter 805. The counter output is then fed to another retrigger-able multi-vibrator 809 in order to recover the original modulation. The advantage of this arrangement is that the number of carrier cycles per bit may be changed without having to impose constraints on the duty cycle of the power signal carrier. The recovered modulation may then be decoded to recover the information.

Figure 9:
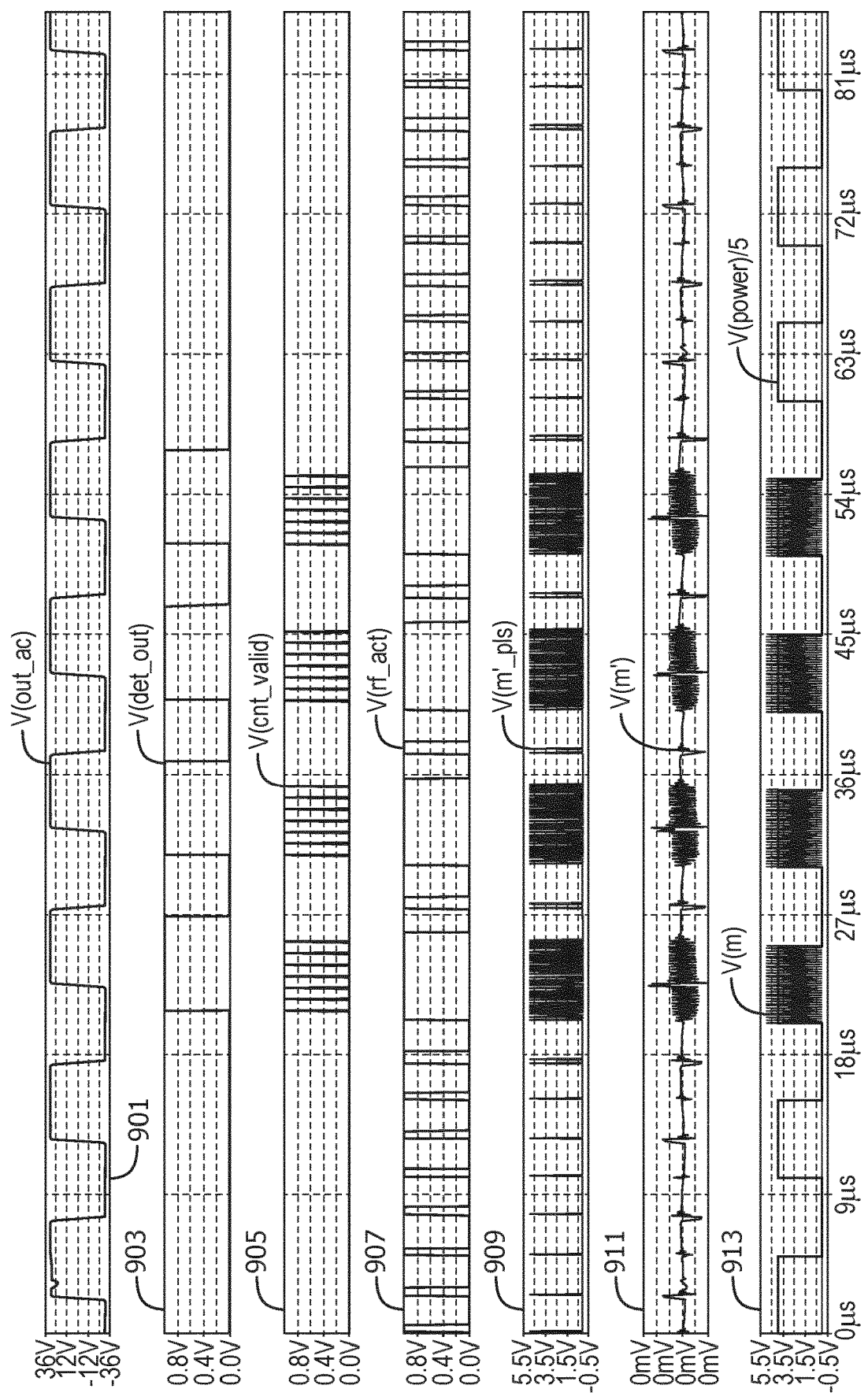
FIG. 9 represents signals including power signal and a communication signal in transmitter or receiver according to an embodiment.

FIG. 9 shows example waveforms of modulation and detection in relation to the embodiments described previously. Trace 901 shows the unrectified AC power output of the system i.e. the voltage across capacitor 506. Trace 903 shows the output of the detector of multi-vibrator 809. Trace 905 shows the counter 805's output. Trace 907 shows the carrier detector signal which is the output of multi-vibrator 807. Trace 909 shows the recovered pulses from comparator 803. Trace 911 shows the input to the high-pass filter. Lastly, trace 913 shows the power signal driver signal with communication input signal modulation superimposed (for visualisation) upon it.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer or processing unit. In the device claim enumerating several means, several of these means may be embodied by one and the same item of hardware. The mere fact that certain measures are recited in mutually different dependent claims does not indicate that a combination of these measures cannot be used to advantage.

Aspects of the invention may be implemented in a computer program product, which may be a collection of computer program instructions stored on a computer readable storage device which may be executed by a computer. The instructions of the present invention may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins). Moreover, parts of the processing of the present invention may be distributed over multiple computers or processors.

Storage media suitable for storing computer program instructions include all forms of non-volatile memory, including but not limited to EPROM, EEPROM and flash memory devices, magnetic disks such as the internal and external hard disk drives, removable disks and CD-ROM disks. The computer program product may be distributed on such a storage medium, or may be offered for download through HTTP, FTP, email or through a server connected to a network such as the Internet.

The invention claimed is:
1. A power transmitter comprising:
   a transmitter resonant circuit,
      wherein the transmitter resonant circuit comprises a power transmitting inductor, wherein the transmitter resonant circuit has a transmission resonance at a first frequency,
wherein the power transmitting inductor is arranged to generate a power transfer signal,
wherein the power transmitting inductor is arranged to be magnetically couplable to a power receiver inductor in a power receiver;
a power transmitter driver operably coupled to the power transmitter resonant circuit, wherein the power transmitter driver is arranged to generate a drive signal for the power transmitting inductor; and
a transmitter communication resonant circuit coupled to the power transmitting inductor without significant magnetic coupling to the power transmitter inductor,
wherein the transmitter communication resonant circuit is arranged to establish a transmitter communication resonance at a second frequency,
wherein the second frequency is different from the first frequency,
wherein the power transmitting inductor contributes to the transmission resonance and the transmitter communication resonance,
wherein the transmitter resonant circuit and the transmitter communication resonant circuit are arranged to exhibit both transmission resonance and the transmitter communication resonance simultaneously.

2. The power transmitter of claim 1, wherein the power transfer signal and a communication signal pass via the power transmitting inductor.

3. The power transmitter of claim 2, wherein the power signal and the communication signal may be present simultaneously.

4. The power transmitter of claim 1,
wherein the transmitter communication resonant circuit comprises a transmitter communication inductor,
wherein the transmitter communication inductor is coupled in series to the power transmitting inductor, and
wherein the transmitter communication inductor is arranged to be not substantially magnetically coupled to a receiver communication inductor.

5. The power transmitter of claim 4, wherein the transmitter communication inductor is a separate component from the power transmitting inductor.

6. The power transmitter of claim 4, wherein the transmitter communication inductor comprises an electromagnetic shield.

7. The power transmitter of claim 3, wherein the transmitter communication inductor is formed by a portion of the power transmitting inductor.

8. The power transmitter of claim 1, further comprising a communication driver circuit,
wherein the communication driver circuit is coupled to the transmitter communication resonant circuit,
wherein the communication driver circuit is arranged to generate a communication drive signal.

9. The power transmitter of claim 1, further comprising a communication receiver,
wherein the communication receiver is coupled to the transmitter communication resonant circuit,
wherein the communication receiver is arranged to decode a communication signal.

10. The power receiver of claim 9,
wherein the receiver communication resonant circuit comprises a receiver communication inductor coupled in series to the power receiver inductor, and
wherein the receiver communication resonant circuit is arranged to be not substantially magnetically coupled to a communication inductor of a power transmitter.

11. The power receiver of claim 9, wherein the receiver communication inductor is a separate component from the power transmitting inductor.

12. The power receiver of claim 10, wherein the receiver communication inductor comprises an electromagnetic shield.

13. The power receiver of claim 9, wherein the receiver communication inductor is a portion of the power receiving inductor.

14. The power transmitter of claim 1, wherein the transmitter communication resonant circuit is different from the transmitter resonant circuit.

15. The power transmitter of claim 1, wherein the transmitter communication resonant circuit is capacitively coupled to the power transmitting inductor.

16. A power receiver comprising:
a power receiving inductor, wherein the power receiving inductor is arranged to extract power from a power transfer signal;
a receiver resonant circuit operably coupled to the power receiving inductor, wherein the receiver resonant circuit is arranged to establish a receiving resonance at a first frequency; and
a receiver communication resonant circuit,
wherein the receiver communication resonant circuit is different from the receiver resonant circuit,
wherein the receiver communication resonant circuit is coupled to the power receiver inductor without significant magnetic coupling to the power receiver inductor,
wherein the receiver communication resonant circuit is arranged to establish a receiver communication resonance at a second frequency,
wherein the second frequency is different from the first frequency,
wherein the power receiver inductor contributes to the receiving resonance and the receiver communication resonance,
wherein the receiver resonant circuit and the receiver communication resonant circuit are arranged to exhibit both the first frequency and the second frequency simultaneously.

17. The power receiver of claim 16, wherein the communication signal passes via the power receiving inductor.

18. The power receiver of claim 16, further comprising a communication driver circuit coupled to the receiver communication resonant circuit, wherein the communication driver circuit is arranged to generate a communication drive signal.

19. The power receiver of claim 16, further comprising a communication receiver,
wherein the communication receiver is coupled to the receiver communication resonant circuit,
wherein the communication receiver is arranged to decode a communication signal.

20. The power receiver of claim 16, wherein the receiver communication resonant circuit is capacitively coupled to the power receiver inductor.

* * * * *